United States Patent [19]

Schweickhardt

[11] Patent Number: 4,991,354
[45] Date of Patent: Feb. 12, 1991

[54] ABRASIVE SAW ADJUSTABLE WORKPIECE SUPPORTING FRAME

[75] Inventor: Karl B. Schweickhardt, St. Louis County, Mo.

[73] Assignee: Great Eagle Enterprises Corporation, Manchester, Mo.

[21] Appl. No.: 264,539

[22] Filed: Oct. 31, 1988

[51] Int. Cl.⁵ .................................................. B24B 7/00
[52] U.S. Cl. ..................................... 51/78; 51/240 R; 125/35; 144/286 R; 144/286 A
[58] Field of Search ................... 51/78, 39, 66, 283 R, 51/166 R, 215 R, 240 R; 125/35; 144/286 R, 286 A; 83/156, 158

[56] References Cited

U.S. PATENT DOCUMENTS 2,780,035  2/1957  Wintgens ........................ 51/240 R
3,124,018  3/1964  Gough ............................ 51/240 R
4,635,515  1/1987  Altman .......................... 144/253 R Primary Examiner—Frederick R. Schmidt
Assistant Examiner—M. Rachuba
Attorney, Agent, or Firm—Polster, Polster and Lucchesi

[57] ABSTRACT

An adjustable workpiece supporting frame is disclosed for use with an abrasive saw supported relative to a base pan. The frame is removably mounted to the base pan and includes a plurality of generally parallel rails extending generally horizontally of the pan and also generally longitudinally of the saw. A series of spaced free-turning rollers are mounted on the rails for supporting a workpiece thereon while enabling longitudinal adjustment of the workpiece relative to the saw. A workpiece fence extends above and is generally parallel to the parallel rails with rollers, and is supported by the frame. The workpiece fence is laterally adjustable relative to the saw for precise measured adjustment thereof. The adjustable workpiece supporting frame thus provides both lateral and longitudinal adjustment relative to the abrasive saw.

10 Claims, 5 Drawing Sheets

ABRASIVE SAW ADJUSTABLE WORKPIECE SUPPORTING FRAME

BACKGROUND OF THE INVENTION

The present invention relates to an adjustable workpiece supporting frame for use with an abrasive saw supported relative to a base pan, and more particularly to a removably mounted adjustable workpiece supporting frame which provides both lateral and longitudinal adjustment of a workpiece relative to the abrasive saw.

In my prior U.S. Pat. No. 4,428,159, there is disclosed a portable direct drive abrasive saw particularly well suited for cutting ceramic floor tile bricks, or other masonry, metal, or refractory materials. In the installation of ceramic flooring or roof tile, it is often necessary for the tile installer to specially trim the tile pieces to precisely fit along walls, around pipes, door moldings and other unusual shaped surfaces. By utilizing the rotary abrasive saw apparatus disclosed in my prior patent, tile installers may precisely cut tile to a desired dimension, resulting in a neat appearance for the tile, and avoiding the inadvertent breaking of the tile along dimensioned lines not desired. As disclosed in my aforementioned patent, a workpiece supporting table is reciprocably mounted on frame rails supported by to the base pan, in order to support the work desired to be cut, while also enabling the work be moved toward and away from the saw, as may be desired. The abrasive saw apparatus disclosed in my prior patent is typically constructed for use with relatively smaller tile or other materials that can be readily and easily manipulated on the reciprocably mounted table.

Where it is desired to cut much larger tiles, for example, tiles measuring 16 inches by 16 inches, 18 inches by 18 inches or even 36 inches by 36 inches, having a thickness of $\frac{1}{2}$ up to 3 inches, the apparatus of my aforementioned patent is generally not capable of supporting and at the same time cutting such heavier tiles, as may be desired. For example, it may be desired to cut a 18 inch by 18 inch tile on the diagonal or cut a 36 inch by 36 inch tile down the middle in one pass.

As will be readily understood, such desired cutting of heavier tile requires a workpiece supporting frame that will not only support heavier workpieces, but which will also permit the workpiece to be adjusted relative to the saw for the different types of cutting that are desired. At the same time, the adjustments must be relatively precise to cut the tile exactly to the dimension that is desired.

SUMMARY OF THE INVENTION

Accordingly, it is among the several objects and advantages of the present invention:

the provision of a new and improved adjustable workpiece supporting frame for use with an abrasive saw supported relative to a base pan or the like;

the provision of the aforementioned adjustable workpiece supporting frame which is removably mounted relative to the base pan for use only as may be desired;

the provision of the aforementioned adjustable workpiece supporting fence which may be both laterally and longitudinally adjusted relative to the saw;

the provision of the aforementioned adjustable workpiece supporting fence in which the workpiece supporting fence includes a plurality of generally parallel rails having a series of freely turning rollers mounted thereon for supporting a workpiece thereon while enabling longitudinal adjustment of the workpiece relative to a saw;

the provision of the aforementioned adjustable workpiece supporting frame which includes a workpiece fence that extends above and is generally parallel to the generally parallel rails of the frame and is supported by the frame, the workpiece fence being laterally adjustable relative to the saw;

the provision of the aforementioned adjustable workpiece supporting frame in which the workpiece fence is connected to a laterally adjustable side rail of the frame and is also laterally adjustably mounted relative to the laterally adjustable side rail of the frame;

the provision of the aforementioned adjustable workpiece supporting frame which provides precise measured lateral adjustment of the workpiece fence; and the provision of such an adjustable workpiece supporting frame which is relatively easy and economical to manufacture, which is reliable in operation, which is easy to service, and which has a relatively long service life.

Briefly stated, the adjustable workpiece supporting frame of the present invention is intended for use with an abrasive saw supported relative to a base pan for supporting and cutting heavier materials such as heavy ceramic tile, marble, masonry blocks, and other heavier workpieces. The workpiece supporting frame is supported by and extends horizontally across the base pan for horizontally supporting a workpiece relative to the abrasive saw. The frame includes workpiece adjustment means for adjusting the workpiece relative to the abrasive saw while resting on the frame. The workpiece adjustment means includes lateral and longitudinal adjustment means for lateral and longitudinal adjustment relative to the abrasive saw, at least one of lateral and longitudinal adjustment means also providing incremental measured adjustment relative to the abrasive saw.

The frame may include a plurality of generally parallel rails extending generally horizontally of the pan and also generally longitudinally of the saw. A series of spaced free-turning rollers are mounted on the rails for supporting a workpiece thereon while enabling longitudinal adjustment of the workpiece relative to the saw. A workpiece fence extends above and is generally parallel to the generally parallel rails while being supported by the frame. The workpiece fence is laterally adjustable relative to the saw, thereby providing both lateral and longitudinal adjustment of a workpiece relative to the saw.

The workpiece fence is connected to a laterally adjustable side rail of the frame which also extends generally parallel to the parallel rails and is adjustably mounted relative to the frame. The workpiece fence is also laterally adjustably mounted relative to the laterally adjustable side rail of the frame. At least one scale is provided on the frame to enable precise measured lateral adjustment of the workpiece fence.

The adjustable workpiece supporting frame is releasably mounted to the base pan for easy installation and removal therefrom. Suitable releasable fastening means may also be employed for releasable attachment to the base pan.

Other and further objects and advantages of the present invention will become apparent from the discussion that is to follow.

BRIEF DESCRIPTION OF THE DRAWINGS

In the drawings.

Corresponding reference numerals will be used throughout the several figures of the drawings.

DESCRIPTION OF THE PREFERRED EMBODIMENTS

The following detailed description illustrates the principles of the present invention by way of example only and not by way of limitation. This description will clearly enable one skilled in the art to make and use the invention and describe several embodiments, adaptions, variations, alternative and uses of the invention, as well as its operating principles, including what is presently believed to be the best mode for carrying out the invention.

Figure 1:
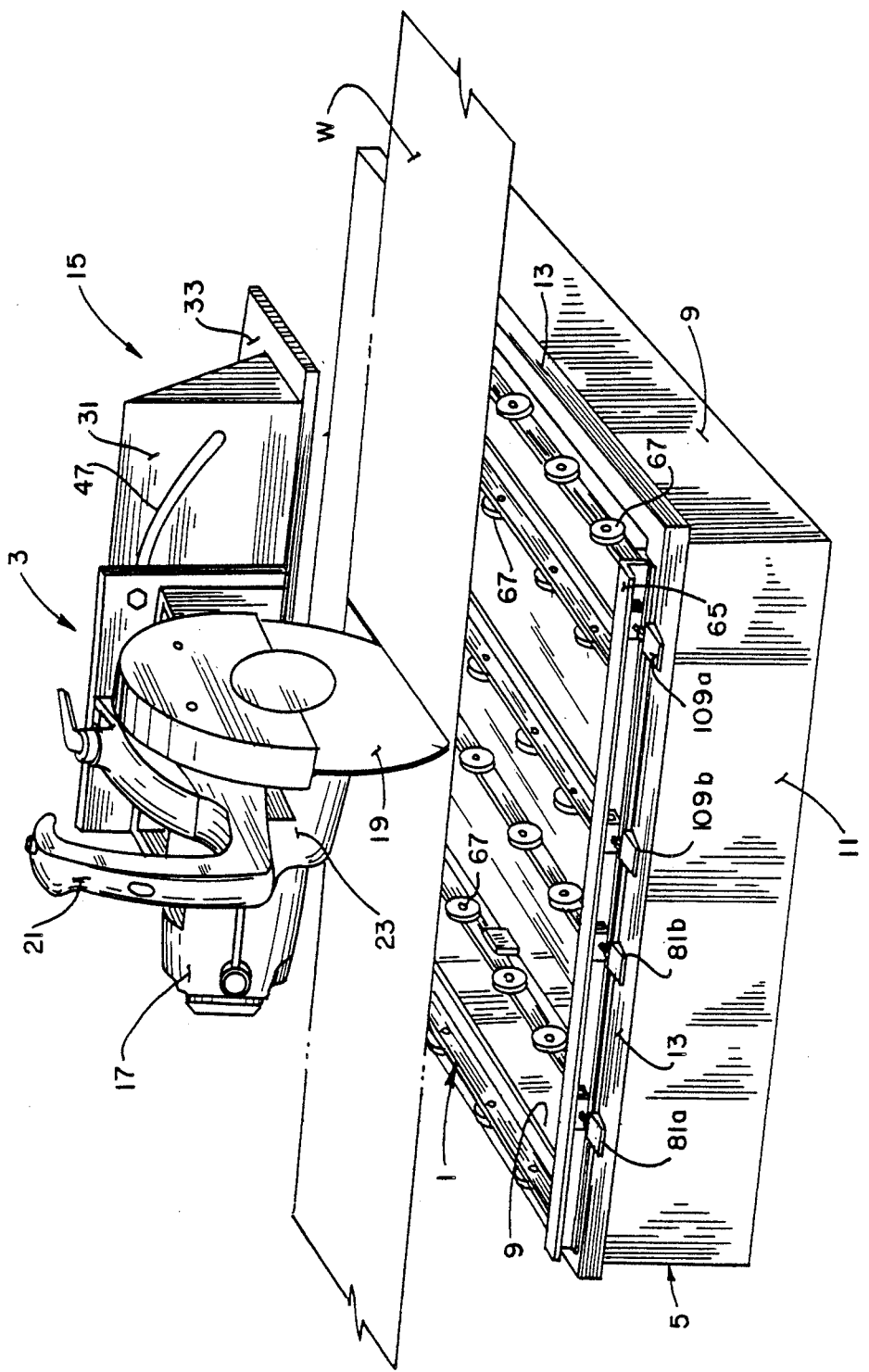
FIG. 1 is an isometric view of a portable abrasive saw which includes the adjustable workpiece supporting frame of the present invention.
Figure 2:
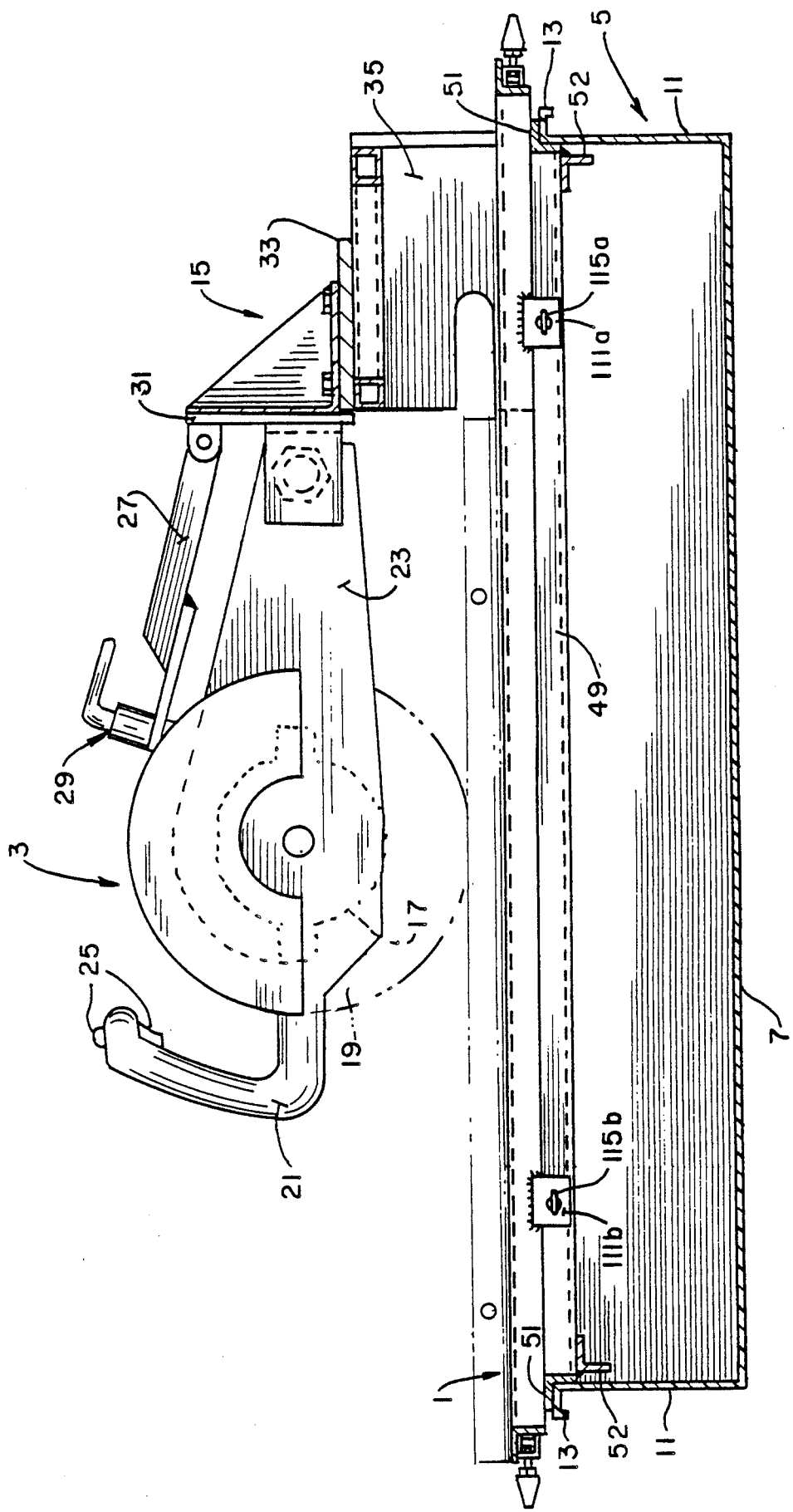
FIG. 2 is side elevational view, partially in section, of the portable abrasive saw shown in FIG. 1.
Figure 4:
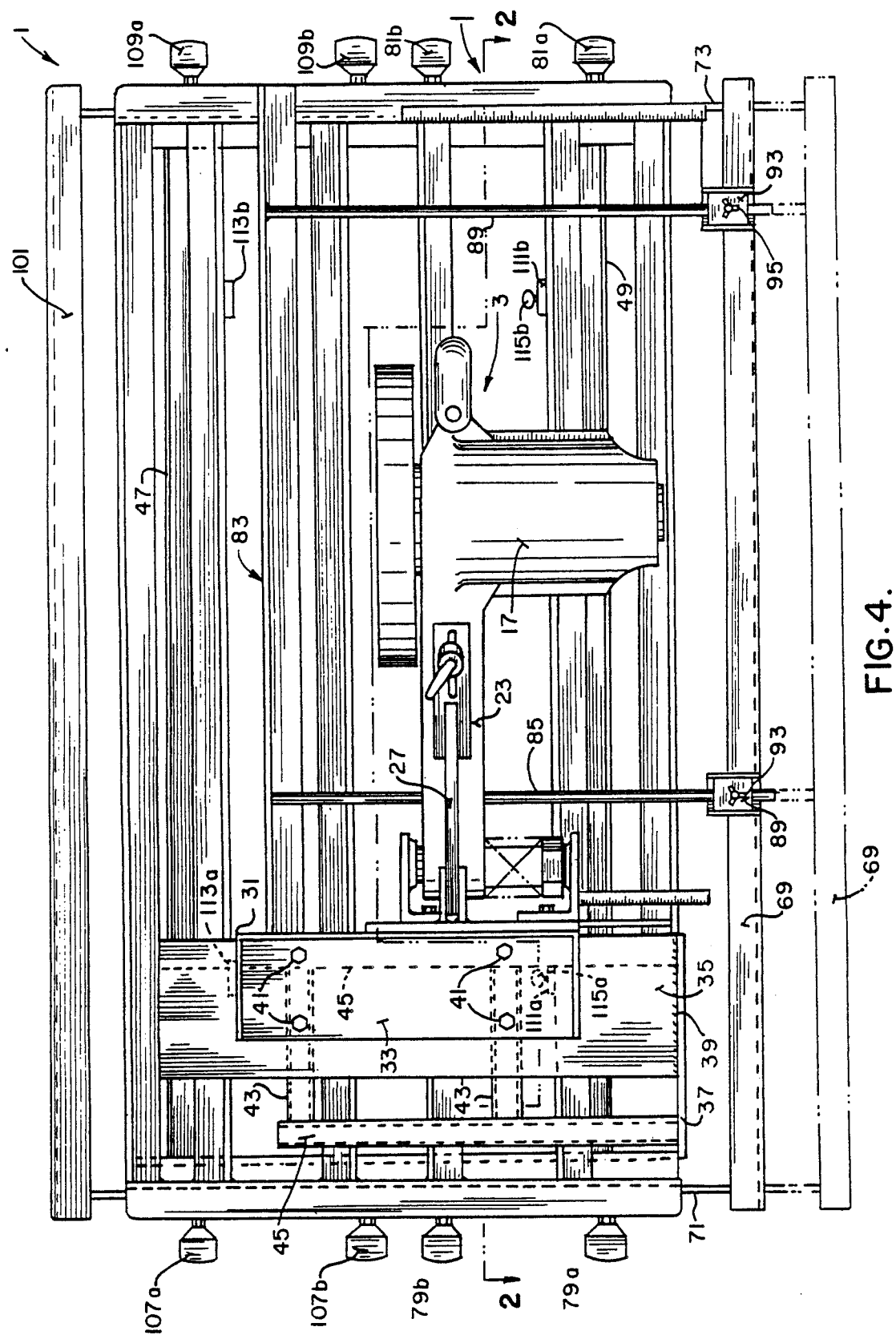
FIG. 4 is a top plan view of the abrasive saw shown in FIG. 1 with the various components of the adjustable workpiece supporting frame also being shown.
Figure 5:
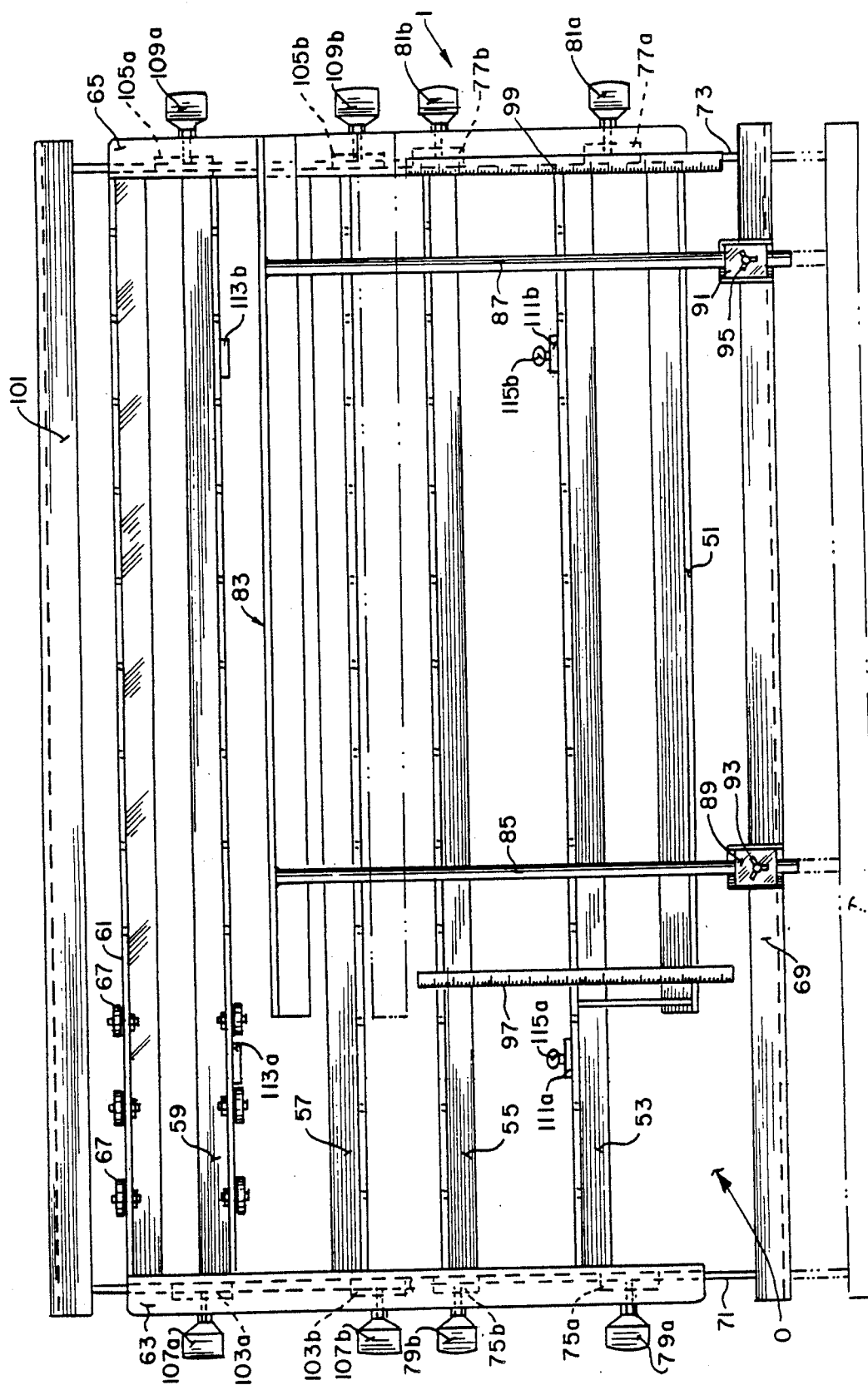
FIG. 5 is a top plan view of the adjustable workpiece supporting frame only, and illustrating the manner in which the frame provides both lateral and longitudinal adjustment of a workpiece relative to an abrasive saw.

Referring now to the drawings, it will be seen that the adjustable workpiece supporting frame, specifically shown in FIGS. 4-5 of the drawings and generally identified by reference character 1, is generally shown in FIGS. 1-2 of the drawings as being adapted for use relative to an abrasive saw 3 that is supported relative to a base pan 5. Base pan 5 is preferably constructed of suitable sheet metal or, high strength, wear resistant, synthetic resin material, such as high density polyethylene or other high strength impact resistant plastic. The base pan 5 is generally rectangular shaped and includes a bottom wall 7, opposite longer side walls 9 and shorter end walls 11. At the open upper end of the base pan 5 is a rolled over lip 13 that extends around the upper edges of the side and end walls 9, 11 to provide a convenient finger hold for carrying the base pan 5, and for also providing a structural stiffener for rigidizing the entire base pan 5. The base pan 5 holds a quantity of coolant (e.g., water) which is circulated over the abrasive saw blade 19 of the saw 3 for cooling the saw blade and work piece W while the work piece W is cut by the abrasive saw 3.

The abrasive saw 3 per se forms no part of the present invention; however, the general description of the abrasive saw 3 will facilitate an understanding of the adjustable workpiece supporting frame 1 of the present invention. The abrasive saw 3 is a unitary, direct drive, rotary saw assembly, similar to that disclosed in my aforementioned U.S. Pat. No. 4,428,159. Abrasive saw 3 is fixedly positioned by frame 15 which, in turn, is supported by the base pan 5.

The abrasive saw 3 includes an induction electric motor 17 which directly drives the abrasive saw blade 19 while cutting a workpiece W, as shown in FIG. 1 of the drawings. A handle 21 is connected to the abrasive saw housing 23, the handle 21 including button controls 25 for operating motor 17 to drive the abrasive saw blade 19 and for operating a pump (not shown), in order to pump coolant from the base pan 5 for cooling the saw blade 19 and the workpiece W while the workpiece W is being cut.

Figure 3:
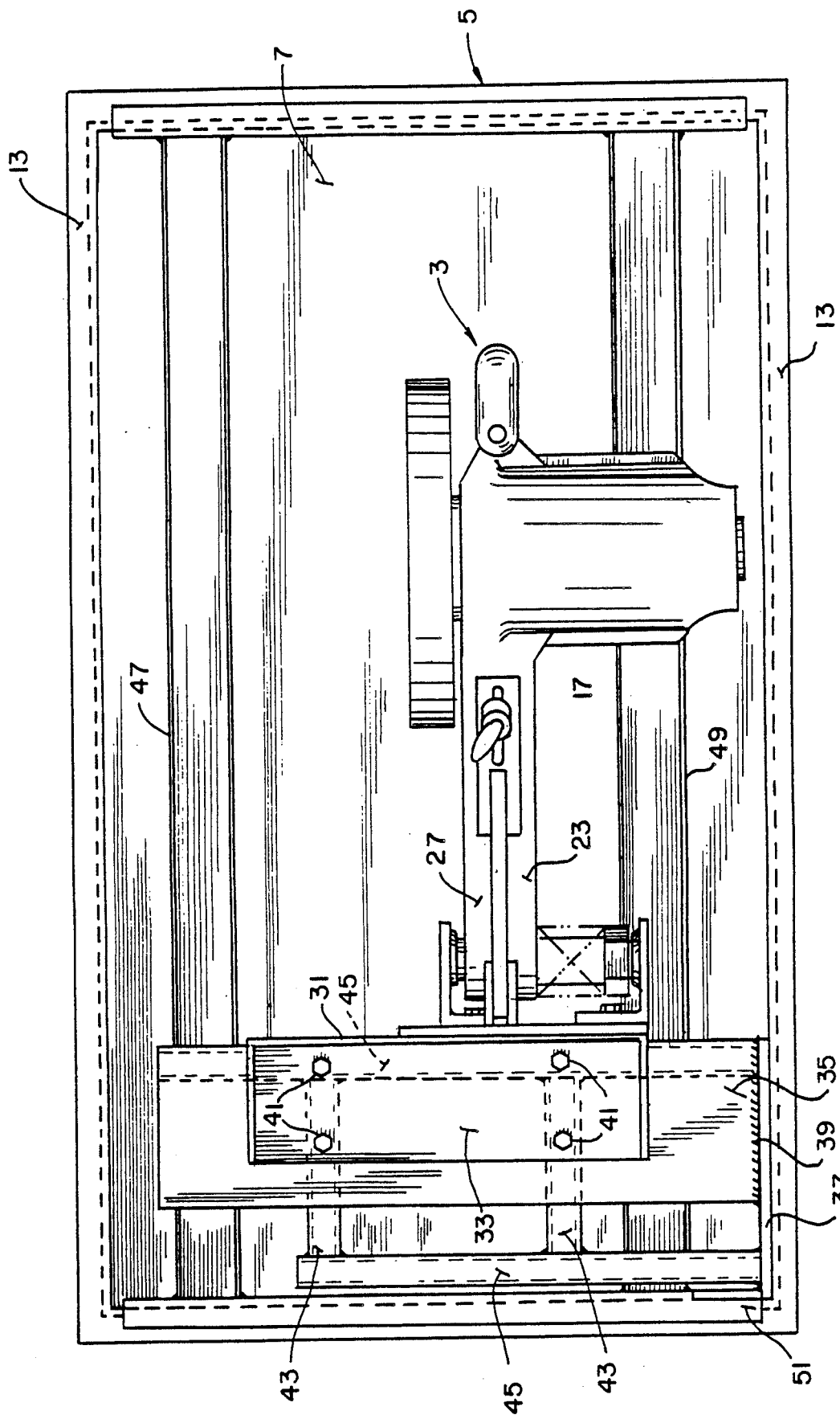
FIG. 3 is top plan view of the portable abrasive saw shown in FIG. 1, and illustrating the mounting of the abrasive saw relative to the base pan, without showing the adjustable workpiece supporting frame of the present invention.

The housing 23 of the abrasive saw 3 is mounted to the saw frame 15 through the connecting bar 27 that connects the bar 27 to the housing 23 through the lever lock assembly 29 at one end, and is connected at the other end to vertical plate support 31. The vertical plate support 31 is connected by welding or the like to the horizontal plate support 33, the later, in turn, being connected by welding or the like, to the saw frame support 35. The saw frame support 35 is welded at 37 to supporting bar 39 (see FIG. 3), the later, in turn, being welded and supported by an L-shaped supporting flange 51 which overlies the lip or flange 13 of the base pan 5, as seen in FIG. 3 of the drawings. The horizontal member 33 of the saw frame 15 is attached by bolts 41 to underlying bars or tubes 43 which are attached to an interconnecting bar or tubes support 45, the later, in turn, being welded to and supported by the supporting bar 39. The above structural description is an example of how the abrasive saw 3 may be supported by the base pan 5, with other structural supporting constructions also being available for use, as may be desired.

As best seen in FIG. 1, the saw blade 19 is shown as being operated in an essentially vertical path relative to the work piece W. It will be noted; however, that the housing 23 of the abrasive saw 3 may be shifted relative to the vertical plate member 31, by movement of same along the arcuate slot 47 of the vertical plate member. This enables the saw blade 19 to cut the workpiece at an angle, i.e., to produce a bevel cut on the workpiece W. As described in my aforementioned U.S. Pat. No. 4,428,159, the details of operation of an abrasive saw, where it can operate to produce the desired cuts in a workpiece W, is described in detail in my prior patent. The present invention; however, is directed primarily to the adjustable workpiece supporting frame 1 which is capable of being mounted relative to the base pan 5, for use with the abrasive saw 3 as generally described herein or with any other type of abrasive saw construction and underlying supporting structure. As best seen in FIGS. 2-3 of the drawings, a pair of rails 47, 49 are spaced from one another and extend between the opposite end walls 11, 11 of the base pan 5. The pair of spaced rails 47, 49 are supported at opposite ends thereof to a frame including interconnected L-shaped supporting plates 51, the L-shaped plate 51 overlying the flange 13 of the base pan 5. Each of the rails 47, 49 are oriented with a pair of spaced vertically extending flanges and with a horizontal flange extending therebetween. The vertical flanges of these rail members 47, 49 provide clamping surfaces for the adjustable workpiece supporting frame 1, as will appear hereafter.

The adjustable workpiece supporting frame 1 of the present invention is constructed for use with the abrasive saw 3 that is supported relative to a base pan 5, as discussed above. The frame is constructed to be removably mounted relative to the base pan 5 for use in cutting very heavy tile or marble slabs, as will be described.

The adjustable workpiece supporting frame 1 includes a plurality of generally parallel longitudinally extending rails 51, 53, 55, 57, 59 and 61 which are attached or secured, such as by welding, to generally transverse or laterally extending rails 63, 65 at opposite ends thereof. As shown in the drawings, each of the rails 51, 53, 55, 57, 59, 61, 63 and 65 are L-shaped angle iron elements which provide substantial strength and rigidity and can be attached by welding, such as described above to each other, as required. It will be noted that each of the generally parallel, longitudinally extending rails 51, 53, 55, 57, 59 and 61 have horizontal and vertical flanges, the horizontal flanges of each of the rails being generally aligned in co-planar relationship, with the vertical flanges extending upwardly therefrom. Each of the transversely extending L-shaped end rails 63, 65 have the vertical flanges thereof attached to the outer margins or edges of the horizontal and vertical flanges of the rails 51-61, such that the horizontal flanges of the end rails 63, 65 are not only in alignment or co-planar relationship with each other, but are also generally aligned in the same plane as the upper edge of the vertical flanges of each of the longitudinal rails 51-61.

A series of free turning rollers 67 are mounted to the vertical flanges of each of the longitudinally extending rails 51, 53, 55, 57, 59 and 61 in generally equally spaced relationship to one another along the longitudinal length thereof. Thus, a heavy workpiece W can be easily manipulated longitudinally relative to the abrasive saw 3 to permit longitudinal adjustment of the workpiece W relative to the abrasive saw 3, as will be apparent. As shown best in FIGS. 1 and 5, 6 rollers 67 are wheels mounted on the rails for rotation about a horizontal axis perpendicular to the rails. However, rollers of other configurations may be used. For example, rollers having a ball element supported from below in a socket may be used to facilitate movement of the workpiece in any direction in a horizontal plane.

In addition to the aforementioned longitudinal adjustment of the workpiece W on the free-turning rollers 67, the adjustable workpiece supporting frame 1 also provides for lateral adjustment of the workpiece W relative to the abrasive saw 3. Specifically, a laterally adjustable guide rail 69 is capable of being moved, for example, from the full line position to the dotted line position shown in FIGS. 4–5 of the drawings to provide lateral or transverse movement relative to the fixed components of the adjustable workpiece supporting frame 1. The laterally adjustable side rail 69 includes extension arms 71, 73, at opposite ends thereof, which are slidably received within slide supports attached to the vertical flange of the end rail 63, 65 on an opposite side thereof from the longitudinally extending rails 53, 61. As best seen in FIG. 5 of the drawings, slidable supports 75a, 75b are shown in dotted lines as being positioned to slidably receive the extension arm 71 while slidable supports 77a, 77b are constructed to receive the extension arm 73 on the opposite side of the frame. Thus, the laterally adjustable side rails 69 can be moved to and from the fixed components of the frame as the extension arm 71, 73 are slidably moved relative to the slidable supports 75a, 75b and 77a, 77b, respectively. A series of threaded locking knobs 79a, 79b extend through the slidable supports 75a and 75b on one side of the frame one and locking knobs 81a and 81b through the slidable supports 77a, 77b on the opposite side of the frame for slidably locking and engaging the extension arms 71, 73 to position and hold extension arms 71, 73, and thus the laterally adjustable side rail 69 in a predetermined or pre-selected position.

A workpiece fence 83, also comprising an L-shaped angle iron element has its horizontally extending flange resting upon end rail 65, at one end thereof, and is also supported by various rollers 67 in the vicinity of the longitudinal rails 51-61, to position the workpiece fence 83 thereabove. The workpiece fence 83 is shown as being generally parallel to the longitudinally extending rails 51-61 and includes a pair of spaced extension arms 85, 87 which are received within openings (not shown) of the block supports 89, 91 attached to the laterally adjustable side rail 69. The fence locking/unlocking threaded knobs 93, 95 extend through the extension rod supports 89, 91 to releasably lock the extension rods 85, 87 in a predetermined or pre-selected position relative to the laterally adjustable side rail 69, as may be desired.

One or more measure scales 97, 99 may be attached by welding or otherwise to the upper edges of the longitudinally extending rails 51-53, as best seen in FIG. 5 of the drawings, to permit a user or operator of the adjustable workpiece supporting frame 1, to laterally adjust the workpiece fence 83 to the desired position. Thus, an operator may loosen the knobs 79a, 79b and 81a, 81b on opposite ends of the frame to releasably unlock the extension arms 71, 73 to enable the laterally adjustable side rails 69 to be moved to the desired position for accommodating a particular sized workpiece W. The workpiece fence 83 may then be at the desired position, and the knobs 79a, 79b and 81a, 81b may be rotated to their locked position to releasably lock the extension arms 71, 73, thereby positioning the laterally adjustable side rail 69 to the desired setting. If further adjustment is necessary, the fence locking/unlocking knobs 93, 95 may be unloosened to enable the extension arms 85, 87 of the workpiece fence 83 to be further adjusted to the precise measured adjustment as reflected on the measuring scales 97, 99. Thereafter, the fence locking/unlocking knobs 93, 95 will then be tightened.

It will thus be seen that a workpiece W can be longitudinally adjusted on the longitudinal rails 51-61 by the free-turning rollers 67, while also being laterally adjusted through the laterally adjustable side rail 69 and associated independently adjustable workpiece fence 83.

As a modified form of the present invention, an additional laterally adjustable side rail 101 may be provided on the opposite side of the frame 1 from the laterally adjustable side rail 69. The laterally adjustable side rail 101 also includes extension arms 103, 105 which are received within slidable supports 103a, 103b and 105a, 105b attached to the vertically extending flange of the end rails 63, 65 shown in FIG. 5. The locking knobs 107a, 107b and 109a, 109b are respectively associated with the slidable supports 103a, 103b and 105a, 105b in the same manner as the corresponding structure associated with the laterally adjustable side rail 69. This not only provides and additional lateral extension or enlargement of the adjustable workpiece supporting frame 1, but may also, in conjunction with the workpiece fence 83, assist in providing lateral adjustment to the workpiece W on opposite sides of the adjustable workpiece supporting frame 1.

The adjustable workpiece supporting frame 1 is removably mounted relative to the base pan 5 to provide versatility. Thus, when the adjustable workpiece supporting frame 1 is removed from the base pan 5, the reciprocably mounted table as shown in my aforementioned U.S. Pat. No. 4,428,159 may be used. When the adjustable workpiece supporting frame 1 is desired to be mounted relative to the base pan 5, the spaced longitudinal side rails 51–61 simply rest upon the L-shaped supporting plates 51, 51 on opposite sides of the base pan 5, as best seen in FIG. 2. Extending downwardly from vertical flange of the longitudinal rail 53, 59 are a series of plates 111a, 111b and 113a, 113b; thumb screws 115a, 115b respectively, extend through plates 111a, 111b for hand-tight threaded locking engagement relative to the vertical flange of the frame rail 49 to fasten the adjustable workpiece supporting frame 1 relative to the base pan 5. The plates 113a, 113b extending downwardly from the rail 59 may simply slidably contact the frame rail 47 or may also be provided with corresponding thumb screws for locking purposes, if desired.

As best seen in FIG. 5 of the drawing, an opening O, from the shortened rail 51, enables the adjustable workpiece supporting frame 1 to be mounted over the saw frame support 35. The laterally adjustable side rail 69 may, if necessary, be sufficiently separated from the adjustable workpiece supporting frame 1 to allow the frame 1 to be positioned on the base pan 5 relative to the abrasive saw 3, as shown in the drawings. The opening of the frame 1 receives the saw frame support 35 in the area of welded attachment to the supporting bar 39, as seen in FIG. 4.

From the foregoing, it will be appreciated that the adjustable workpiece supporting frame 1 of the present invention provides lateral and longitudinal adjustment of a workpiece W relative to an abrasive saw 3. Preferably at least one of the adjusting means, such as the laterally adjusting workpiece fence 83, provides incremental measured adjustment relative to the abrasive saw 3 for the precise cutting that is desired. Longitudinal adjustment is preferably provided by a series of spaced free-turning rollers 67 mounted on longitudinally extending rails which both support a workpiece W thereon, while also enabling longitudinal adjustment of the workpiece W relative to the abrasive saw 3. The workpiece fence 83 extends above the frame and is laterally adjustable relative to the abrasive saw 3, and further includes independent lateral adjustment relative to a laterally adjustable side rail 69 to which it is mounted. A second laterally adjustable side rail 101, on an opposite side of the frame from the first laterally adjustable side rail, may also be provided to enlarge the capacity of and provide additional flexibility and adjustment to the frame.

In view of the above, it will be seen that the several objects and features of this invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

I claim:

1. An adjustable workpiece supporting frame for use with an abrasive saw supported relative to a base pan, the workpiece supporting frame being supported by and extending generally horizontally across the base pan for horizontally supporting a workpiece relative to said abrasive saw, said frame including a plurality of generally parallel rails extending longitudinally of said frame, adjustment means for adjusting a workpiece relative to said abrasive saw while resting on said frame, said workpiece adjustment means including lateral and longitudinal adjustment means for lateral and longitudinal adjustment relative to said abrasive saw, and means for providing incremental measured adjustment relative to said abrasive saw, said longitudinal adjustment means comprising a series of spaced freely-turning rollers mounted to said parallel rails for rollingly supporting the work piece thereon and for permitting ease of movement of the workpiece toward and away from the abrasive saw, and said lateral adjustment means including incremental adjustment means for adjusting said workpiece substantially normal to said generally parallel rails, the lateral adjustment means comprising a workpiece fence extending generally parallel to said parallel rails and positioned above said frame, said workpiece fence being connected to a laterally adjustable side rail of said frame, and said workpiece fence also being laterally adjustable relative to said frame.

2. The adjustable workpiece supporting frame as defined in claim 1 wherein said frame further includes a second laterally adjustable side rail on an opposite side of said frame from said first laterally adjustable side rail.

3. The adjustable workpiece supporting frame as defined in claim 2 wherein said frame is removably mounted relative to said base pan.

4. An adjustable workpiece supporting frame for use with an abrasive saw supported relative to a base pan, said frame being removably mounted relative to said pan, said frame have a plurality of generally parallel rails extending generally horizontally of said pan and also generally longitudinally of said saw, a series of spaced freely-turning rollers mounted on said rails for supporting a workpiece thereon while enabling longitudinal adjustment of the workpiece relative to said saw, and a workpiece fence extending above and generally parallel to said generally parallel rails and being supported by said frame, said workpiece fence being laterally adjustable relative to said saw, thereby providing both lateral and longitudinal adjustment of a workpiece relative to said saw.

5. The adjustable workpiece supporting frame as defined in claim 4 wherein said workpiece fence is connected to a laterally adjustable side rail which also extends generally parallel to said parallel rails and is adjustably mounted relative to said frame.

6. The adjustable workpiece supporting frame as defined in claim 5 wherein said workpiece fence is also laterally adjustably mounted relative to said laterally adjustable side rail of said frame.

7. The adjustable workpiece supporting frame as defined claim 6 wherein said frame further includes at least one scale positioned relative to said workpiece fence for precise measured lateral adjustment thereof.

8. The adjustable workpiece supporting frame as defined in claim 7 wherein said laterally adjustable side rail includes spaced extension rods slidably supported by said frame and releasably locked to said frame by locking/unlocking knobs mounted to said frame for lateral adjustment of said side rail.

9. The adjustable workpiece supporting frame as defined claim 8 wherein said workpiece fence includes a pair of extension arms releasably locked to aid side rail by fence locking/unlocking knobs connected to said side rail for lateral adjustment of said workpiece fence relative to said side rail.

10. The adjustable workpiece supporting fence as defined in claim 9 said frame further includes a second laterally adjustable side rail on an opposite side of said frame from said first laterally adjustable side rail.

* * * * *